United States Patent [19]
Karpenko

[11] 4,029,290
[45] June 14, 1977

[54] IN SERVICE EXERCISABLE TILT DISC CHECK VALVE

[75] Inventor: Anatole N. Karpenko, San Francisco, Calif.

[73] Assignee: Anchor/Darling Valve Company, Bala Cynwyd, Pa.

[22] Filed: May 21, 1975

[21] Appl. No.: 579,695

[52] U.S. Cl. .............................. 251/82; 137/527.8; 251/58; 251/63.4

[51] Int. Cl.² ........................................ F16K 15/18

[58] Field of Search .................... 137/527.8, 527.4; 251/58, 82, 250; 92/13.1

[56] References Cited

UNITED STATES PATENTS

| | | | |
|---|---|---|---|
| 1,367,911 | 2/1921 | Koplin | 251/82 |
| 2,251,414 | 8/1941 | Neal | 251/82 |
| 2,504,006 | 4/1950 | Davis | 251/82 |
| 3,106,220 | 10/1963 | Hose | 137/527.8 X |
| 3,494,589 | 2/1970 | Mumma | 251/58 X |
| 3,650,506 | 3/1972 | Bruton | 251/58 X |
| 3,818,805 | 6/1974 | Johansson | 92/13.1 |
| 3,883,111 | 5/1975 | Jourdan | 251/82 |

Primary Examiner—Arnold Rosenthal

[57] ABSTRACT

An in service exercisable tilt disc check valve is provided having an externally controlled power actuator connected to the valve shaft for moving the valve disc relative to the valve seat. The valve shaft has a radially extending tooth which is received in an elongated sector socket in the valve disc. As the shaft is rotated, the tooth engages the end shoulders of the socket and provides a connection between the shaft and valve disc. With the tooth positioned intermediate the socket ends, the valve disc is free to swing on the shaft.

By selectively positioning the valve shaft, the valve disc may be forced to close against the valve seat to inspect the sealing integrity of the valve or the disc may be displaced from the valve seat to "exercise" the valve. The valve shaft may also be positioned to allow the valve disc to pivot normally as a check valve.

A pneumatic power cylinder is coupled to the valve shaft through a rack and gear drive while a second cylinder limits the degree of extension of the power cylinder. A compression spring biases the rack to drive the valve disc to the closed position.

8 Claims, 8 Drawing Figures

IN SERVICE EXERCISABLE TILT DISC CHECK VALVE

BACKGROUND OF THE INVENTION

In nuclear power plants, check valves are utilized in various fluid circuit configurations, such as to control the flow of coolants to the fuel core and in emergency safety systems.

One circuit configuration provides a check valve between the reactor vessel and a high pressure core injection system. This system replaces small quantities of water lost from the reactor if the reactor pressure is only slowly reduced.

Another core cooling system is the low pressure core injection system in which large volumes of water at low pressure are injected into the vessel to restore water level to at least mid-core level.

These safety injection systems supply water from a storage tank through appropriate pumps to any leg of the primary loop. The use of check valves in these configurations is somewhat different from normal check valve usage, and those accustomed to thinking of check valves in their normal context, on the discharge side of pumps, will have to mentally adjust to the particular use of check valves on these safety injection systems. Conventionally, on a pump discharge, the check valve is normally open to flow. Whenever the pump stops, the check valve closes automatically and prevents back flow of water through the pump. On these safety systems, however, the valves are normally closed and held closed by high system pressure in the reactor vessel acting on the outlet or downstream side of the valve disc. When an emergency occurs, it results in lowering the system pressure to a point lower than that of the safety injection system. When this occurs, the check valve opens, permitting flow of the cooling water into the reactor vessel.

The check valves are installed in tandem pairs in each circuit to form a double barrier which provides a redundancy in case of failure of one of the valve discs. It is feared, however, that these installations do not ensure that both check valves reseat or that the sealing integrity of both valves would be effective barriers. It is possible that one valve could be stuck open or have a leaky seal and thus leave only one barrier effective during plant operation.

Similarly, because the check valves are held shut for normally long periods of time with considerable pressure differential pressing the disc against the seat, corrosion products may form between seat and disc and prevent the disc from opening when called upon.

Another problem encountered in these safety injection systems is water hammer caused by reverse flow through the check valves where the valve disc "slams" shut causing a high pressure surge. The primary loops utilize canned multi-stage pumps which are high speed compact units with low pump and motor inertia. When the pump power cuts off, the water in that leg slows down very rapidly and may establish reverse flow in fractions of a second. To prevent or minimize this reverse flow, the check valve must have extremely fast response and this is especially important in these multi-pump systems. A typical reactor fluid circuit would have several primary loops, each with their own pump, check valves and heat exchangers, with each loop leading to the common reactor vessel. If power is cut off to one pump, the remaining pumps will maintain a high differential pressure in the common reactor. This would cause the column of water in the de-energized loop to decelerate very rapidly. With a check valve having slow response, the flow in this loop could reverse and drive the idle pump in reverse.

From the foregoing, certain requirements have been imposed on check valves for nuclear reactor service. They must pass an "in service" air leakage test with 45 or 50 psig (1 inch diameter maximum conduit) which assures valve tightness and the ability to isolate and prevent radioactive fluid from seeping into other pipe systems during plant shutdown and maintenance. They must have a remotely controlled exercisable actuator to open the valve 20° to 30°, with a balanced pressure on both sides of the valve disc, and provide assurance that the valve disc is not sticking and is free to operate. Also they must have a "non-slam" characteristic and maintain low pressure surges during closure. Finally, experiments with existing nuclear plants, and confirmed by additional experiments and research, show that a properly designed tilt disc check valve, in comparison with a swing check valve, produces one-half to one-third less pressure surge.

SUMMARY OF THE INVENTION

It is therefore a principal object of the present invention to provide a tilt disc check valve having a power actuator wherein the valve may be put in a closed mode, an exercising mode or a normal operating mode of operation.

It is another object of the present invention to provide an external power actuator for such a valve which may be remotely energized and which will revert to the closed mode upon loss of its remote energizer.

Another object is to provide such a device that is so proportioned to position the valve disc in an exercising mode which may be overcome by nominal backflow through the valve and allow the valve to close in an emergency.

A further object is to provide such a power actuator which utilizes a duplex power cylinder to drive the valve disc shaft in varying positions by utilizing one of the pistons of the duplex cylinder as an integral limit stop for the other piston.

DESCRIPTION OF THE PREFERRED EMBODIMENT

Figure 1:
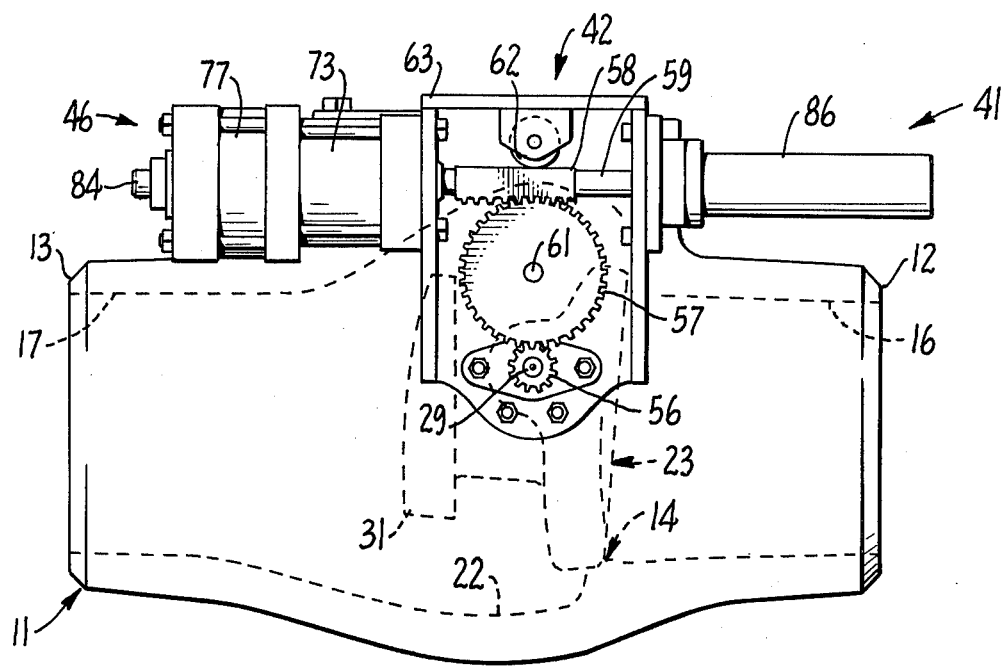
FIG. 1 is a side elevational view of a tilt disc check valve incorporating the valve disc actuator of the present invention.

Referring to the drawings, there is shown a valve body 11 having ends 12 and 13 for attachment in a fluid circuit, such as in a nuclear power plant system. Valve seat 14 is provided at the interior of valve body 11 in longitudinal alignment with inlet and outlet passages 16 and 17. A circular valve seat ring 18 presenting a beveled sealing face 19 is supported on annular ring 21 adjacent inlet passage 16. Enlarged chamber 22 in valve body 11 is situated between valve seat 14 and outlet passage 17. Valve disc 23 is supported in chamber 22 for swinging movement between a position of sealing engagement with valve seat 14 and to a position disposed therefrom.

Valve disc 23 includes circular dish-shaped plate 24 supporting at its outer periphery a face ring 26 having a profile complementary to the sealing face of valve seat 14. Laterally spaced bosses 27 extend outwardly of valve plate 24 on the side opposite sealing ring 26. The bosses have transverse bores 28 therein which are offset above the axis of circular plate 24. Bores 28 receive valve stem shafts 29 which are supported on valve body 11 and are similarly offset with respect to the axis of valve seat 14. Valve disc 23 also carries counterweight 31 on strut 32 diametrically spaced beyond bores 28 from circular plate 24.

Figure 2:
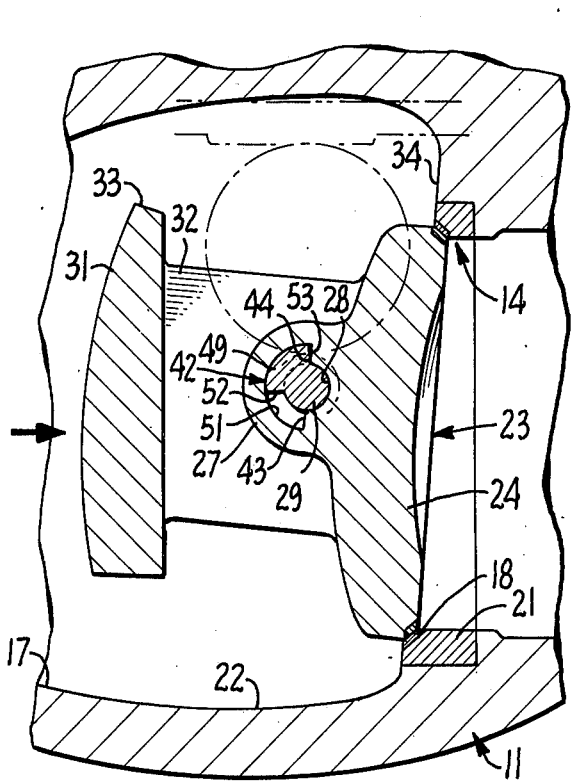
FIG. 2 is a fragmentary elevational section of the device of FIG. 1 illustrating the valve disc, valve seat and valve shaft at the interior of the valve body and with the valve disc in sealing engagement with the valve seat during reverse flow through the valve.
Figure 3:
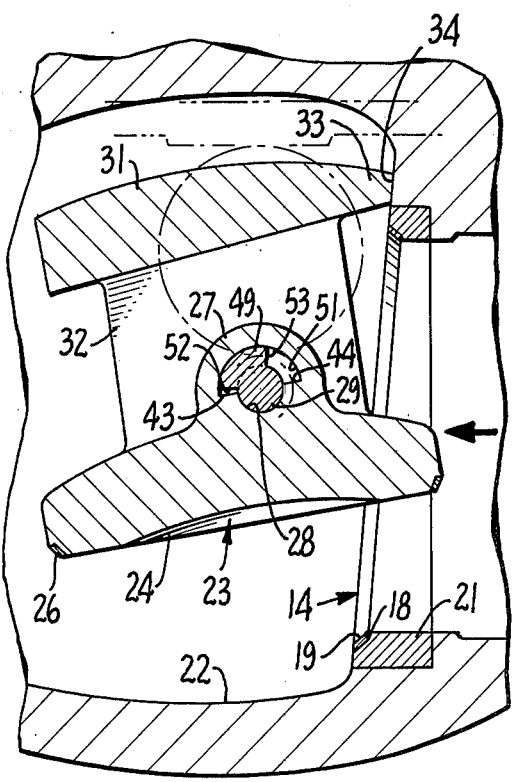
FIG. 3 is a view similar to FIG. 2 with the valve disc swing away from the valve seat during forward flow through the valve.
Figure 4:
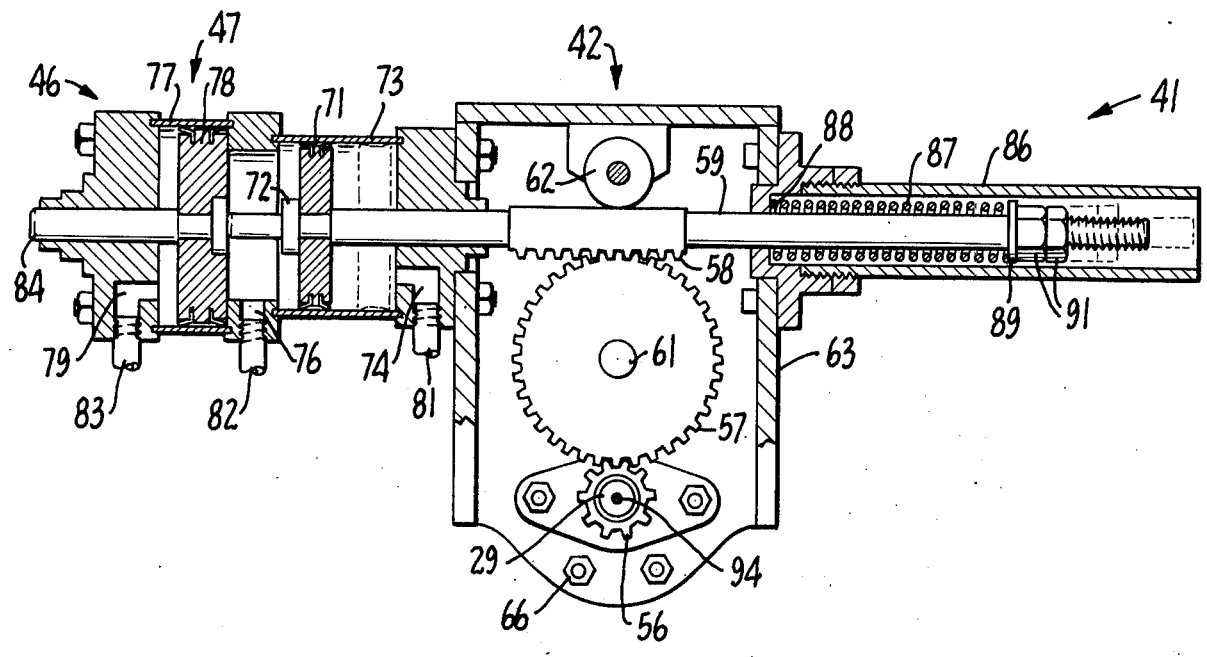
FIG. 4 is a fragmentary side sectional view of the power actuator of the device in FIG. 1.

As shown in FIGS. 2 and 3, normal check valve action may be accomplished in the usual manner of tilt disc check valves. Reverse fluid flow from the side of valve disc 23, opposite seal 14, will swing the valve disc counterclockwise about shafts 29 to close the valve with counterweight 31 assisting in the closure (see FIG. 2). Forward fluid flow from the side of valve disc 23 on the same side as seal 14 will pivot the valve away from the seat in a clockwise direction and elevate counterweight 31 to a position shown in FIG. 3. Counterweight 31 has stop 33 which contacts surface 34 when in the fully raised position. This is a description of the action of tilt disc check valves in general. This type of valve has been shown to have particular usefulness for creating a minimum of pressure surge or water hammer upon closing.

As mentioned, other requirements have been imposed on these check valves when they are used in nuclear power service which previous tilt disc check valves could not fulfill. In the improved valve, a power actuator 41 is provided on each side of the valve body for moving valve disc 23. Each power actuator 41 includes a drive means 42 for pivoting the valve disc 23. Each drive means has spaced first and second engagement means 43 and 44 operatively connected to valve disc 23, and they in turn are formed for operatively coupling each drive means 42 to the valve disc when in engagement therebetween but to allow free swinging movement of the valve disc when positioned out of engagement. Power means 46 are also provided for shifting the drive means 42 and selectively positioning either the first or second engagement means in engagement with the valve disc. A selectively positionable stop means 47 is associated with power means 46 and is formed for limiting the degree of shift of drive means 42.

Figure 5:
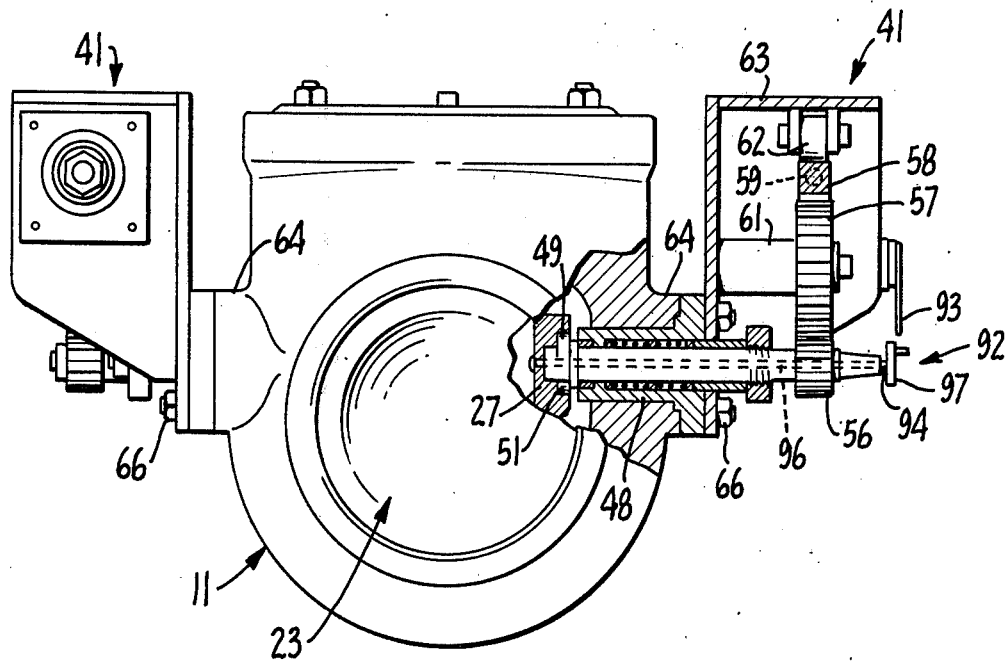
FIG. 5 is an end elevational view of the device of FIG. 1 with parts broken away to show the structural connection of the power actuator to the valve disc.

Each drive means 42 includes a valve stem shaft 29 journaled for rotation through valve body 11 on bearing sleeve 48. Sleeve 48 supports bearings and packing seals as shown in FIG. 5. The end of each shaft 29, interior of valve body 11, carries a radially extending tooth 49. Tooth 49 is slidably received in an elongated sector socket 51 in valve disc boss 27 adjacent transverse bore 28. By selectively rotating the shafts 29 simultaneously, the opposed faces 52 and 53 of tooth 49 will engage the first and second end shoulders of socket 51 and provide a coupling between shaft 29 and valve disc 23. By rotating tooth 49 to a position intermediate the ends of socket 51, as shown in FIGS. 2 and 3, the disc is allowed free swinging movement on valve stem shaft 29. The interconnection of tooth 49 and socket 51 forms in effect a clutch having a lost motion area between positive coupling elements. In the preferred embodiment, as shown, the tooth sector is 100° and the sector socket is 180°.

The end of each shaft 29 exterior of valve body 11, is keyed to gear 56. Gear 56 meshes with gear 57, which in turn is driven by rack 58. Rack 58 is carried intermediate the ends of rod 59 and is translated thereby to rotate the aforementioned gear train. Gear 57 is rotatably supported on shaft 61 and rack 58 is held in engagement with gear 57 by pressure roller 62. Shaft 61 and roller 62 are supported on upstanding box shaped structure 63. Structure 63 is fastened to bosses 64 on valve body member 11 by bolts 66. Bolts 66 also fasten bearing sleeve 48 to valve body 11.

Power means 46 is supported by structure 63 in axial alignment with rack translating rod 59. Piston 71 is carried on one end of rod 59 by collar 72 and is sealingly slidable in cylinder 73. Ports 74 and 75 supply fluid pressure to alternate sides of piston 71 to translate rod 59. Coaxial with cylinder 73 is cylinder 77 having free floating piston 78 carried therein. Piston 78 forms a stop to limit the outward travel of piston rod 59. Cylinders 73 and 77 form a duplex air cylinder each having air supply ports at their ends 74 and 79 and a common supply port therebetween 76. Ports 74, 76 and 79 are connected to a remotely controlled air source through lines 81, 82 and 83. Air pressure applied in the proper sequence will selectively position piston 71 and associated gear rack 58 to selectively position tooth sector 49. Since piston 78 is of a larger cross-sectional area than piston 71, the stop will still limit the travel of piston 71 even though ports 79 and 74 are supplied with similar air pressure. Piston 78 has a short shaft 84 journalled for linear movement through the end cap of cylinder 77. The position of stop piston 78 may be ascertained by noting the extension of shaft 84 beyond the end cap.

The other end of rod 59 is journaled for linear travel in tubular member 86. A compression spring 87 extends from a shoulder 88 of tubular member 86 to a washer 89 positioned at the end of rod 59 by threaded nuts 91. Tightening of nuts 91 preloads spring 87 to bias rod 59 in the direction to close valve disc 23.

As shown in FIG. 5, a pair of power actuators 41 are supplied on alternate sides of the valve body 11 and each actuator is balanced to act uniformly on each side of the valve disc 23 through each of the spaced bosses 27.

A valve disc position indicator 92 indicates the instantaneous angular attitude of the valve disc 23 on scale 93. Shaft 94 is journaled in longitudinal bore 96 of valve stem shaft and is connected to valve disc 23 at one end and carries marker wheel 97 at its outer end.

Figure 6:
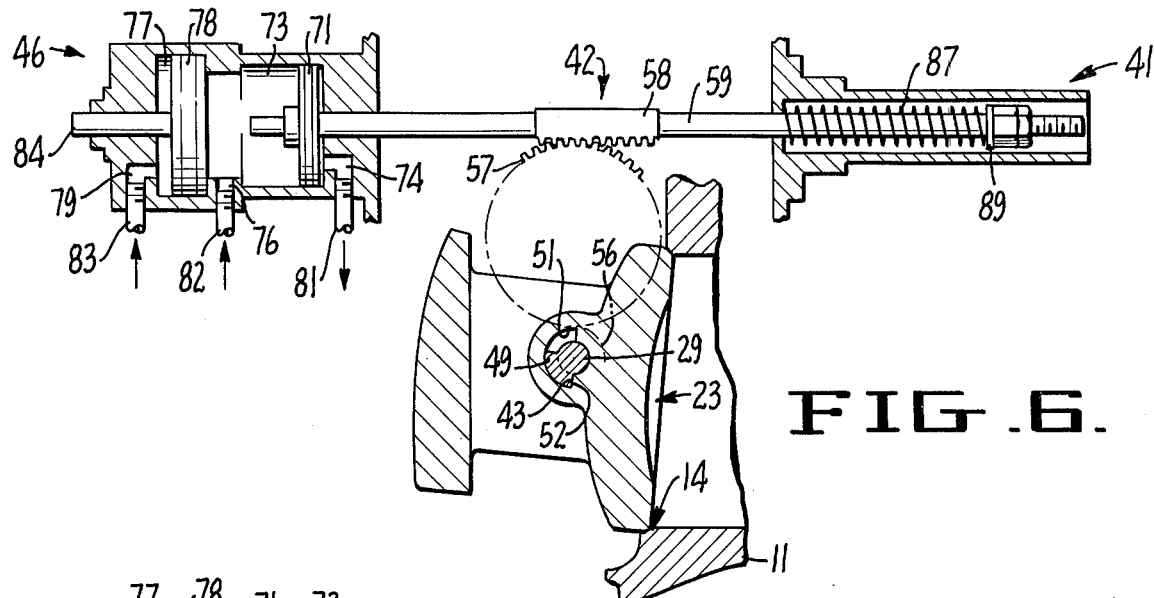
FIG. 6 is a diagrammatic view of the power actuator and valve disc and seat as they would appear in the power assisted valve closed mode of operation.
Figure 7:
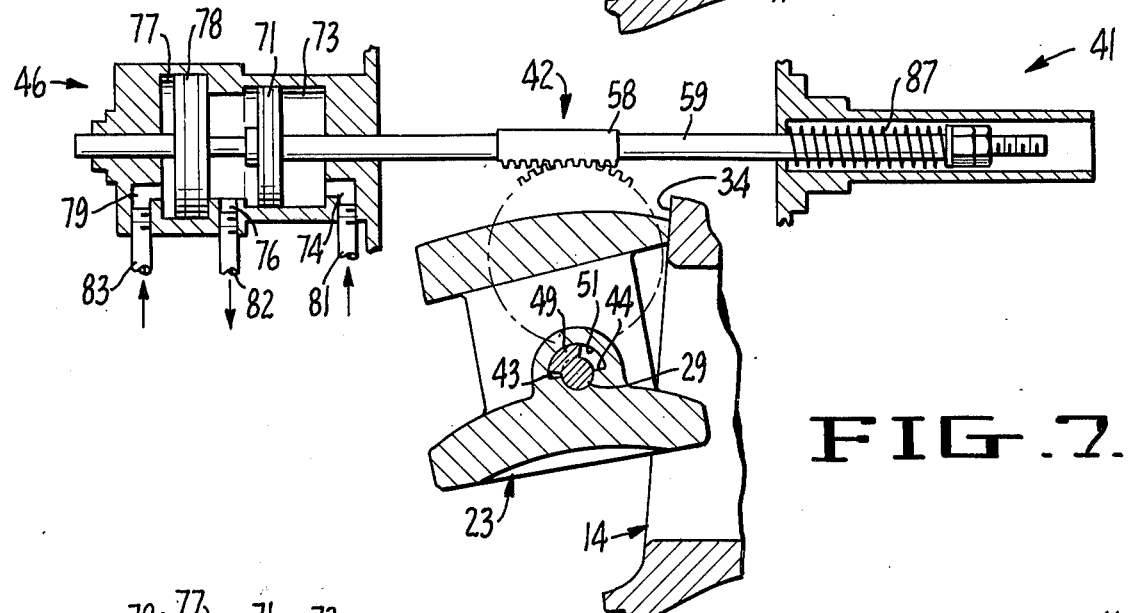
FIG. 7 is a diagrammatic view similar to FIG. 6 but with the power actuator in a neutral position wherein the valve may function in a normal manner depending on the flow through the valve.
Figure 8:
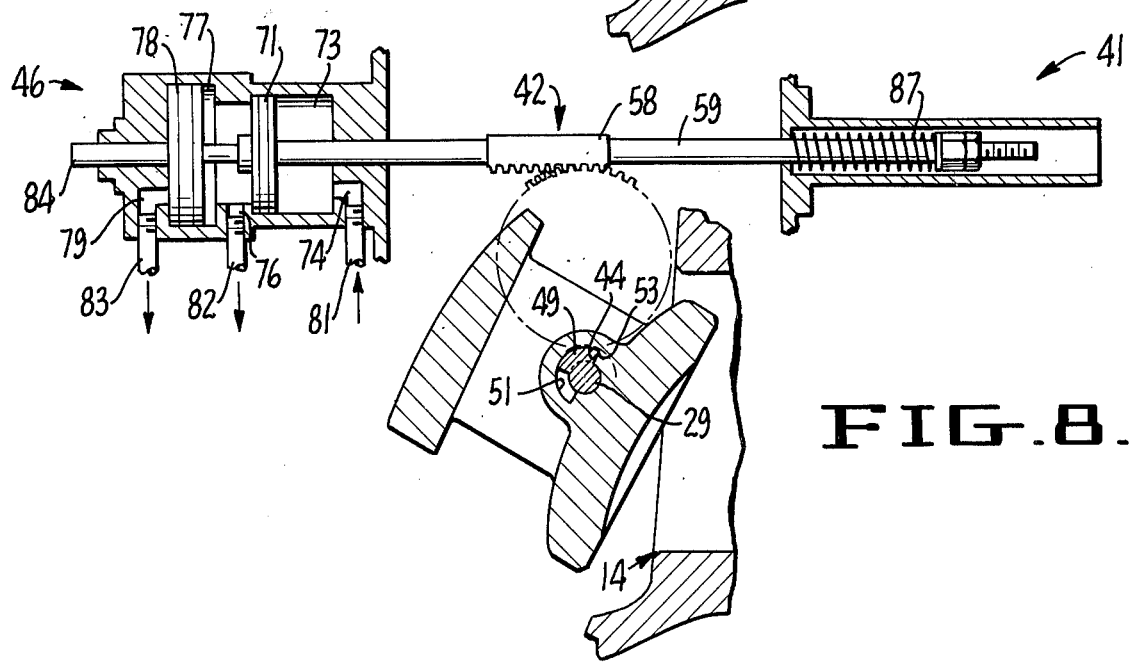
FIG. 8 is a diagrammatic view similar to FIGS. 6 and 7 with the power actuator in a position to exercise the valve by moving the valve disc off of the valve seat.

In operation, and as shown diagrammatically in FIGS. 6, 7 and 8, valve disc 23 may be positioned by power actuator 41 in either the power operated closed mode, the normal operating mode or the power operated open or "exercising" mode of operation.

Cylinder ports 74, 76 and 79 are supplied with pressurized air or vented through lines 81, 82 and 83 from a remote control, such as air valves (not shown).

FIG. 6 illustrates the position of valve disc 23, drive means 42 and power means 46 in the power assisted closed mode of operation allowing an air leakage test to be conducted to determine the sealing integrity of the valve. Piston 71 is shifted to translate rod 59 to its right hand position. Air line 82 supplies pressurized air to cylinder port 76 while port 74 is vented through line 81. Biasing spring 87 also acts to move rod 59 toward the right, as shown. Rack 58 is positioned by rod 59 to rotate gears 57 and 56 to turn valve stem shaft 29 in the counterclockwise direction. Tooth sector 49 bears on first shoulder 43 of sector socket 51 and forces valve disc 23 against valve seat 14.

FIG. 7 illustrates the position of drive means 42 and power means 46 which allows free swinging of valve disc 23 in the normal operating mode of operation. Stop piston 78 is shifted to limit the travel of power piston 71 by supplying pressurized air to port 79 through air line 83 and venting port 76 through line 82. Power piston 71 is shifted by supplying pressurized air to air line 81 and port 74. This translates rod 49 a selected distance and positions tooth sector 49 at a selected position allowing free swinging of the valve disc 23. The open arc portion of socket 51, that is, the lost motion area, is greater than the arc subtended by valve disc 23 when it is swung between seat 14 and stop surface 34. For instance, tooth sector 49 is chosen to have 100° of arc, sector socket 51 has 180° of arc and thus has 80° of open area. The free swing arc of valve disc 23 between stop surface 34 and valve seat 14 is 75°. This leaves 5° of arc as a tolerance factor between the ends of tooth 49 and socket 51. By positioning sector tooth 49 such that the end shoulders of socket 51 always have several degrees of arc clearance, even when the valve disc is at its extreme open or closed positions, the valve disc will be assured of always having clearance to fully close on seat 14 or be fully open without interference from sector tooth 49.

FIG. 8 illustrates the position of drive means 42 and power means 46 in the power assisted exercising mode of operation. Pressurized air is supplied to port 74 while ports 76 and 79 are vented. This translates rod 49 to the extreme left position and also fully compresses spring 87. Valve shaft 29 is rotated with tooth 49 bearing on second shoulder 44 to rotate valve disc 23 to the open position. Power means 46 and drive means 42 are dimensioned such that the disc is opened between 20° and 30° from valve seat 14. In FIG. 8, with piston 71 at its fully extended position, tooth 49 rotates valve disc 25° from the valve closed position. At this attitude, valve disc 23 still confronts valve seat 14 and, if reverse flow through the valve should occur, the valve disc would tend to rotate and close on the valve seat assisted by spring 87. The relative power factors of power cylinder 71 and biasing spring 87 are chosen such that even nominal reverse flow will close the valve. This provides a safety factor wherein the valve will close in an emergency even when the valve is positioned in the power assisted exercising mode of operation.

From the foregoing, it will be seen that an in service exercisable tilt disc check valve has been disclosed having a power actuator which will place the valve disc in a closed mode, a normal operating mode or an exercising mode of operation, an exercising mode of operation in which it is possible to operate the check valve while it is in service and provide an air seat leakage test. These two features greatly distinguish the valve of the present invention over what has been known heretofore.

I claim:
1. A tilt-disc check valve, comprising
a valve body having valve seat means therein,
tilt-disc valve means within said valve body adapted to cooperate with said valve seat means,
means positioned substantially centrally on one face of said tilt-disc valve means for both supporting said valve means and for positively rotating said valve means in both directions about an axis located substantially centrally with respect to said one face and parallel thereto,
said supporting and rotating means being adapted to positively rotate said valve means between a closed position in contact with said seat means and a partially open position out of contact with said seat means, and
lost-motion means included in said supporting and rotating means rendering said valve means free for rotational movement between the closed position and a fully open position when said supporting and rotating means is in mid-position between the limits of its travel corresponding to the closed and partially open positions of said valve means.

2. A tilt-disc check valve, comprising
a valve body having valve seat means therein,
tilt-disc valve means within said valve body adapted to cooperate with said valve seat means,
rotary shaft means mounted on said valve body for rotation relative thereto and extending within said valve body,
radially-extending tooth means on said rotary shaft means within said valve body, said tooth means having a predetermined width circumferentially of said shaft means,
socket means positioned substantially centrally on one face of said tilt-disc valve means for mounting the latter on said shaft means for rotation relative thereto, said socket means being adapted to encompass said radially-extending tooth means and having a width circumferentially of said shaft means greater to a predetermined degree than such width of said tooth means, and
means for rotating said shaft means selectively to first and second opposed limit positions of rotational movement and to a third position therebetween, said tooth means engaging one end of said socket means to hold said valve means closed in said first limit position of said shaft and engaging the other end of said socket means to hold said valve means partially open in said second limit position of said shaft, said valve means being free for movement as a check valve between a fully closed and a fully open position when said shaft is in said third position.

3. A tilt-disc check valve in accordance with claim 2, wherein said means for rotating said shaft means includes a rod having a rack thereon, a gear interconnecting said rack and said shaft means for rotating said shaft means selectively in opposite directions, a first piston mounted on a first end of said rod and slidable in a cooperating cylinder, ports in said cylinder for fluid admission and withdrawal from opposite sides of said first piston, a second piston in said cylinder and movable to limit travel of the rod, and a port for fluid admission and release to and from said cylinder on the side of said second piston remote from said first piston.

4. A tilt-disc valve in accordance with claim 3, and including resilient means connected to said rod for continuously urging said rod in a direction to move said valve means to the closed position.

5. A tilt-disc valve in accordance with claim 3, wherein said second piston has a larger surface than said first piston.

6. A tilt-disc valve in accordance with claim 3, wherein fluid under pressure is admitted to said cylinder between said pistons to move said valve means into the closed position.

7. A tilt-disc valve in accordance with claim 3, wherein fluid under pressure is admitted to said cylinder through said ports communicating with the outer respective sides of said pistons to move said shaft means into such mid-position, whereby said valve means can swing freely on the shaft to act as a check valve.

8. A tilt-disc valve in accordance with claim 3, wherein fluid under pressure is admitted to said cylinder through said port communicating with the side of said first piston remote from said second piston to move said valve means positively to such partially open position to demonstrate that the valve disc is freely movable.

* * * * *